(12) United States Patent
Tang et al.

(10) Patent No.: US 7,747,421 B2
(45) Date of Patent: Jun. 29, 2010

(54) HEAD ASSIGNMENT MODELING AND SIMULATION

(75) Inventors: Wei-Pai Tang, Redmond, WA (US); Timothy F. Su, Palo Alto, CA (US)

(73) Assignee: The Boeing Company, Chicago, IL (US)

( * ) Notice: Subject to any disclaimer, the term of this patent is extended or adjusted under 35 U.S.C. 154(b) by 867 days.

(21) Appl. No.: 11/315,103

(22) Filed: Dec. 23, 2005

(65) Prior Publication Data

US 2007/0150087 A1    Jun. 28, 2007

(51) Int. Cl.
G06G 7/48    (2006.01)
(52) U.S. Cl. .......................................... 703/7; 700/101
(58) Field of Classification Search ...................... 703/7; 700/101
See application file for complete search history.

(56) References Cited

U.S. PATENT DOCUMENTS

| | | | | |
|---|---|---|---|---|
| 4,696,707 A | * | 9/1987 | Lewis et al. | 156/64 |
| 5,933,353 A | | 8/1999 | Abriam et al. | |
| 6,073,670 A | * | 6/2000 | Koury | 156/425 |
| 6,799,081 B1 | * | 9/2004 | Hale et al. | 700/98 |
| 6,944,584 B1 | * | 9/2005 | Tenney et al. | 703/22 |
| 7,376,480 B2 | | 5/2008 | Hagen | |
| 7,407,556 B2 | * | 8/2008 | Oldani et al. | 156/64 |
| 2005/0039842 A1 | | 2/2005 | Clark et al. | |
| 2005/0039843 A1 | | 2/2005 | Johnson et al. | |

OTHER PUBLICATIONS

G. Shao et al., "Manufacturing Data Validation Through Simulation", Oct. 1, 2003, Proceedings of the 2003 European Simulation and Modeling Conference, five unnumbered pages.*

(Continued)

Primary Examiner—Paul L Rodriguez
Assistant Examiner—Russ Guill

(57) ABSTRACT

To model head assignments for a multihead composite material application machine having a set of heads, a ply geometry for a composite part is received and a configuration for the multihead composite material application machine is received. In addition, a constellation of head locations is generated in response to the ply geometry and the configuration for the multihead composite material application machine. Furthermore, a head location of the constellation of head locations is assigned to a corresponding head of the set of heads and a graphical model of the multihead composite material application machine applying the composite material upon the composite part is generated in response to the assigned head locations.

25 Claims, 8 Drawing Sheets

OTHER PUBLICATIONS

T.S. Mujber et al., "Virtual reality applications in manufacturing process simulation", Nov. 30, 2004, Journal of Materials Processing Technology, vol. 155-156, pp. 1834-1838.*

Suk-Hwan Suh et al., "Modelling and Implementation of Internet-Based Virtual Machine Tools", 2003, International Journal of Advanced Manufacturing Technology, vol. 21, pp. 516-522.*

Michael N. Grimshaw et al., "Advanced technology tape laying for affordable manufacturing of large composite structures", 2001, 2001 International Sampe Symposium, eleven unnumbered pages.*

B.G. Prakash, "AUTOLAY—a GUI-based design and development software for laminated composite components", 1999, Computers & Graphics, vol. 23, pp. 95-110.*

Michael N. Grimshaw, "Automated Tape Laying", 2001, ASM Handbook, vol. 21: Composites, DB Miracle and S. Donaldson editors, pp. 480-485.*

Wilhelm DangelMaier et al., "Virtual and augmented reality support for discrete manufacturing system simulation", 2005, Computers in Industry, vol. 56, pp. 371-383; teaches simulation videos of manufacturing equipment.*

Howard B. Olsen et al., "Automated composite tape lay-up using robotic devices", 1993, IEEE International Conference on Robotics and Automation, vol. 3, pp. 291-297.*

Cheol Chang et al., "Collision avoidance of two general robot manipulators by minimum delay time", 1994, IEEE Transactions on Systems, Man, and Cybernetics, vol. 24, No. 3, pp. 517-522.*

R. Alami et al., "Multi-robot cooperation in the MARTHA project", 1998, IEEE Robotics and Automation Magazine, vol. 5, issue 1, pp. 36-47.*

* cited by examiner

HEAD ASSIGNMENT MODELING AND SIMULATION

FIELD OF THE INVENTION

The present invention relates generally to tape and fiber placement systems. More particularly, the present invention relates to a method of head assignment modeling and simulation in a computer-numerical-controlled, composite tape lamination and fiber placement device.

BACKGROUND OF THE INVENTION

Composite materials have been used increasingly in a variety of industries, including the automotive, marine and aerospace industries. In some instances, composite parts can be formed using automated composite material application machines, such as composite tape lamination machines or composite fiber placement machines.

Some conventional composite material application machines, for example, a flat tape lamination machine (FTLM) or a contoured tape lamination machine (CTLM), produce flat or gently contoured composite parts by laying relatively wide strips of composite tape onto generally horizontal or vertical tooling surfaces, such as a mandrel. Other conventional composite material application machines, for example, an automated fiber placement (AFP) machine, are used to produce generally cylindrical or tubular composite parts by wrapping relatively narrow strips of composite tape, or tows, around a rotating manufacturing tool, such as a mandrel.

Generally, existing automated composite material application machines have a single composite material application head. Correspondingly, existing composite material application machine programming systems generally are capable of producing a numerical control (NC) or computer numerical control (CNC) program designed to control a single composite material application machine having a single composite material application head.

In order to more efficiently produce relatively large composite parts, including aircraft fuselage sections, a high-rate, multihead, composite material application machine has been conceived. As conceived, the multihead composite material application machine should be capable of manufacturing a wide variety of composite parts, such as flat spars, stringer charges, wing skins and fuselage barrel sections, as well as composite parts in other industries, such as the automotive, marine, industrial vehicle and prefabricated architectural structure industries.

However, existing composite part programming systems do not have the capacity to efficiently program a composite material application machine with multiple composite material application heads to form a variety of composite parts. Accordingly, it is desirable to provide a method and apparatus that can efficiently produce a composite part program for a high-rate composite material application machine with multiple composite material application heads to form a variety of composite parts without requiring excessive manual programming.

SUMMARY OF THE INVENTION

The foregoing needs are met, to a great extent, by the present invention, wherein in one respect a visual model of head assignments for a multihead composite material application machine having a set of heads is provided.

An embodiment of the present invention pertains to a computer readable medium on which is embedded computer software comprising a set of instructions for executing a method of modeling head assignments for a multihead composite material application machine having a set of heads. In this method, a ply geometry for a composite part is received and a configuration for the multihead composite material application machine is received. In addition, a constellation of head locations is generated in response to the ply geometry and the configuration for the multihead composite material application machine. Furthermore, a head location of the constellation of head locations is assigned to a corresponding head of the set of heads and a graphical model of the multihead composite material application machine applying the composite material upon the composite part is generated in response to the assigned head locations.

Another embodiment of the present invention relates to a system for modeling head assignments of a multihead composite material application machine having a set of heads. The system includes a head constellation generator, head assignment manager, and head constellation visualizer. The head constellation generator generates a constellation of head locations in response to receiving a ply geometry and a configuration for the multihead composite material application machine. The head assignment manager assigns a head location of the constellation of head locations to a corresponding head of the set of heads. The head constellation visualizer generates a graphical model of the multihead composite material application machine applying the composite material upon the composite part in response to receiving the assigned head locations.

Yet another embodiment of the present invention pertains to a method of modeling head assignments for a multihead composite material application machine having a set of heads. In this method, a ply geometry for a composite part is received and a configuration for the multihead composite material application machine is received. In addition, a constellation of head locations is generated in response to the ply geometry and the configuration for the multihead composite material application machine. Furthermore, a head location of the constellation of head locations is assigned to a corresponding head of the set of heads and a graphical model of the multihead composite material application machine applying the composite material upon the composite part is generated in response to the assigned head locations.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of

DETAILED DESCRIPTION

Figure 1:
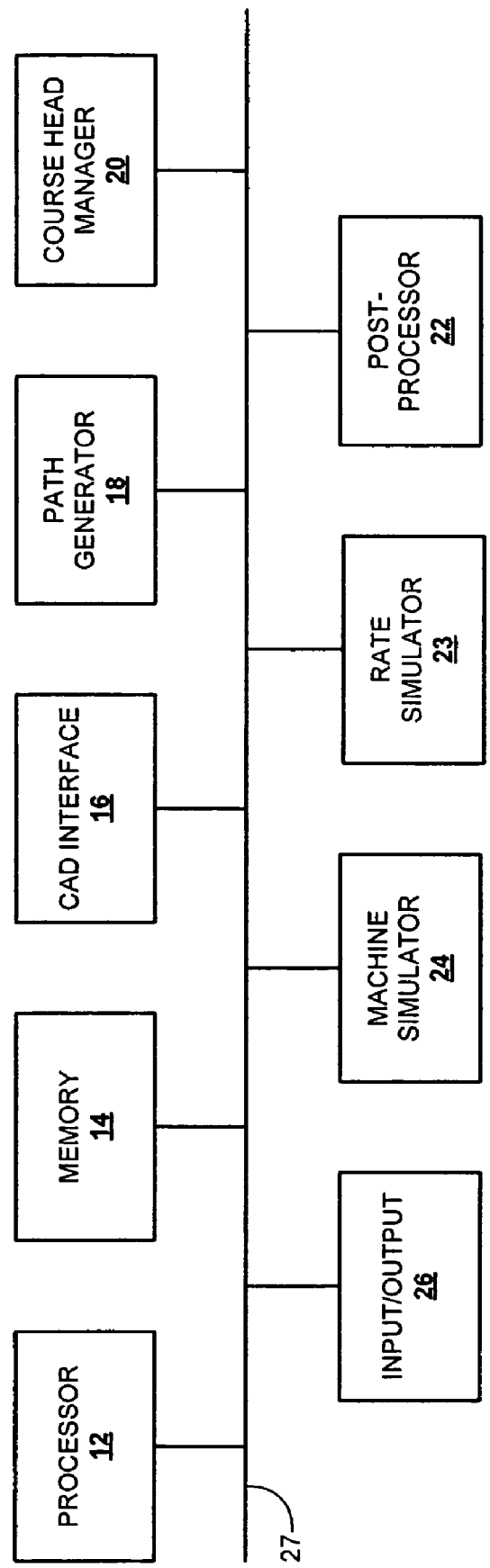
FIG. 1 is a block diagram illustrating a composite part program generator of a type suitable for carrying out the functions of an embodiment of the invention.

An embodiment in accordance with the present invention provides a composite part program generator, which can include a computer-aided design (CAD) system interface, a path generator, a course head manager, a post-processor and a machine simulator. The composite part program generator is capable of producing composite part programs for a wide variety of large, complex composite parts, including relatively flat, contoured, or generally cylindrical composite parts. This programming method can reduce the labor required to produce a composite part program for a multihead composite material application machine by an order of magnitude with respect to manual or existing automated programming methods.

The composite part program generator can produce, for example, composite part programs for use with computer-numerical control (CNC) composite material application machines having a single composite material application head, such as existing composite tape-laying machines and automated fiber placement machines. In addition, the composite part program generator can produce composite part programs for use with multihead CNC composite material application machines, as well as multi-machine composite manufacturing equipment.

The CAD interface can receive a composite part design definition from a CAD system and convert the data into a manufacturing tool surface definition and multiple composite ply definitions. The path generator can produce machine-independent composite material application paths based on the manufacturing tool surface definition and multiple composite ply definitions. In addition, the course head manager can assign the machine-independent paths to specific composite material application heads of a specific type of composite material application machine to produce machine-specific paths.

Furthermore, the post-processor can define a manufacturing tool route, compute machine axis positions, and compose a composite part program that can be used to control the composite material application machine and guide the composite material application heads along the paths. Moreover, the machine simulator can simulate the specific type of composite material application machine and associated controllers to verify correct function of the composite part program. Thus, the composite part program generator can assist a programmer in avoiding composite material application head or machine conflicts, such as collisions.

The composite part program generator can facilitate throughput-efficient assignment of composite material application heads or machines to composite material application paths and ply sequences. In addition, the composite part program generator can produce composite part programs to control a higher number of machine axes than that permitted by the maximum interpolation group size of some existing CNC controllers. For example, some existing composite programming methods are limited to one composite material applicator, or delivery head, whereas the method herein disclosed has been demonstrated on four-head and eight-head configurations having up to 50 machine axes on a common, moveable tool carriage and a corresponding rotating manufacturing tool. Furthermore, this method can be scaled for use with machines having at least sixteen delivery heads or systems having at least sixteen single-head machines.

The invention will now be described with reference to the drawing figures, in which like reference numerals refer to like parts throughout. An embodiment in accordance with the present invention provides a composite part program generator 10 for producing a composite part program that can control a single-head or multihead CNC composite material application machine. FIG. 1 illustrates an embodiment of a representative embodiment of a composite part program generator 10, including a processor 12, memory 14, CAD interface 16, path generator 18, course head manager 20, post-processor 22, rate simulator 23, machine simulator 24 and an input/output (I/O) device 26, all of which are interconnected by a data link 27.

The processor 12, the memory 14 and the input/output device 26 can be part of a general computer, such as a personal computer (PC), a UNIX workstation, a server, a mainframe computer, a personal digital assistant (PDA), or some combination of these. The remaining components can include programming code, such as source code, object code or executable code, stored on a computer-readable medium that can be loaded into the memory 14 and processed by the processor 12 in order to perform the desired functions of the composite part program generator 10.

The CAD interface 16 can receive a composite part definition from a CAD system, such as AutoCAD, manufactured by Autodesk, Inc. of San Rafael, Calif.; Pro/Engineer, manufactured by Parametric Technology Corp. of Needham, Mass.; Microstation, manufactured by Bentley Systems of Exton, Pa.; SolidWorks, manufactured by SolidWorks Corp. of Concord, Mass.; or CATIA, manufactured by Dassault Systemes S.A. of Suresnes, France. The composite part definition can be received in any suitable data file format, including a vector graphics format, such as the .dwg or .dxf file formats (used by AutoCAD) and the .dgn file format (used by Microstation); a boundary representation format, such as the B-REP file format (used by CATIA V4) based on geometric topological boundaries; or a parametric solid/surface feature-based format (used by CATIA V5).

The composite part definition can consist of sequences containing plies. The sequences generally represent layers of a composite material that form the composite part, and plies generally represent a region of a composite material layer. In the CAD data format, for example, each ply can be modeled as a boundary on a complex surface, with associated material and orientation properties.

The CAD interface 16 can convert the received composite part definition data format, which may be unique to the specific CAD system, into a format that is compatible with the path generator 18. For example, the CAD interface 16 can create two data files. The first file can contain the complete surface definition of the composite part, or of a manufacturing tool, such as a mandrel, upon which the composite part is to be formed. This first file can contain data defining each surface region of the composite part, for example, in a B-Spline format. The first file can also define the boundary curves for each surface region. In addition, the first file can contain the various relationships between the boundary curves for each component surface region, describing how the various surface regions fit together.

The second file can contain ply definitions for the various plies that form the composite part. The ply definitions can include, for example, ply boundary data, ply material data and ply orientation data. In addition, each ply can specify a "seed point," that is, a point associated with the ply that defines a location through which the centerline of first composite material segment for that ply must pass.

Based on the composite part surface definition and ply definitions, the composite part program generator 10 can generate paths, which the composite material application heads, can follow to apply the composite material over the manufacturing tool surface, or over a previous ply surface, in order to form the composite part. For example, FIG. 2 illustrates a manufacturing tool 28, or mandrel, for a large, generally cylindrical composite part with eight representative composite material application paths 30 designated in a generally horizontal direction across the surface of the manufacturing tool 28.

Figure 2:
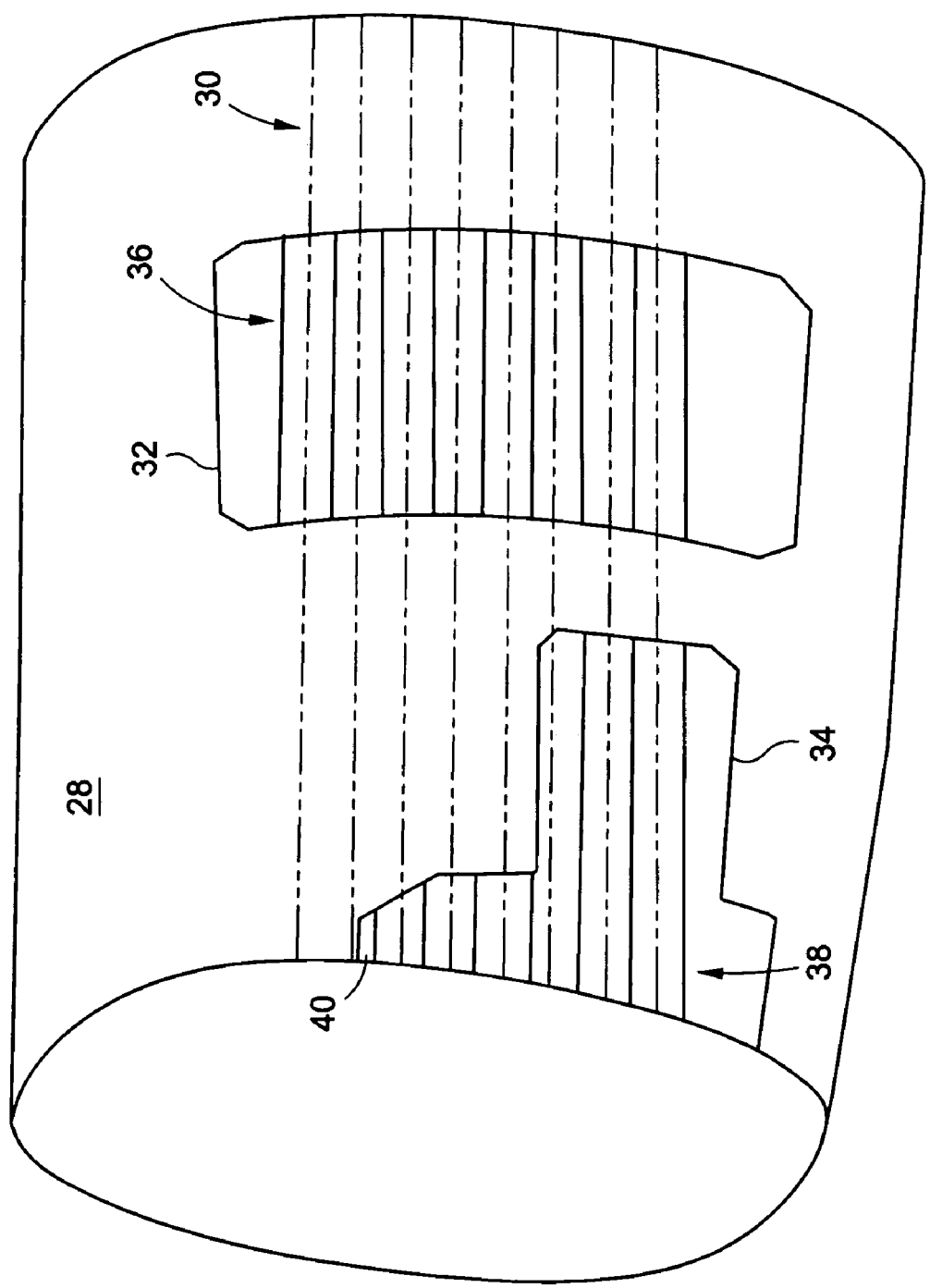
FIG. 2 is a perspective view illustrating a large, generally cylindrical composite part showing designated composite material application paths and tape courses that can be programmed by a preferred embodiment of the invention.

FIG. 2 further illustrates a first ply boundary 32 and a second ply boundary 34. Eight contiguous composite material segments, in this case tape courses 36, which correspond to the composite material application paths 30, are delineated within the first ply boundary 32. Likewise, seven contiguous composite tape courses 38 are delineated within the second ply boundary 34, including a nonstandard tape course 40 having a width that is substantially less than the distance between each of the adjacent pairs of paths 30, or the nominal composite tape width.

As an example, a composite tape-laying machine may have one or more composite material application heads attached to a tool carriage and configured to apply composite tape having a standard or nominal width of three inches, six inches, or any other suitable width. The composite tape-laying machine may further include a composite material application head that applies a strip or multiple strips of composite tape having a nonstandard width. For example, a representative multihead composite tape-laying machine may include one or more standard heads that apply nominal three-inch wide strips of composite tape, as well as one or more specialized heads that apply strips of composite tape of nonstandard width, such as one-eighth inch or one-quarter inch wide strips, or "tows." In addition, a specialized head may have the capacity to apply multiple nonstandard strips up to an aggregate width equal to the nominal tape width, for example, up to twenty-four one-eighth-inch composite tape tows on a machine having a standard nominal tape width of three inches.

Although the composite material application paths 30 and tape courses 36, 38 shown in FIG. 2 are generally horizontal, or parallel to the axis of the manufacturing tool 28 (for reference in this example, the zero-degree fiber orientation), additional plies may have other fiber orientations, such as ninety degrees or forty-five degrees, or any suitable fiber orientation to satisfy the composite part design requirements. In addition, standards are established to set limits on the size of gaps between or overlap of adjacent composite material segments.

Referring again to FIG. 1, the composite material application paths 30 can be defined by the path generator 18. In one embodiment of the composite part program generator 10, the path generator 18 can implement a Cartesian coordinate system, for example, to produce generally flat or contoured parts. In other embodiments, the path generator 18 can implement any suitable coordinate system, for example, a polar coordinate system, such as an angular reference system, for example, to produce generally cylindrical parts on a rotating manufacturing tool 28, a circular coordinate system, a spherical coordinate system; a curvilinear coordinate system; or the like.

The path generator 18 can use the ply boundary definitions created by the CAD interface 16, which describe the areas where composite material is to be applied to form the sequences, or layers, of the composite part, and the manufacturing tool surface definition created by the CAD interface 16, which describes the surface over which the composite part is to be formed, to generate the composite material application paths 30. If the seed point for a ply is not specified in the part definition, the path generator can select a "seed point," for example, the centroid of the ply, as the starting point at which to begin path generation for a given ply.

In various embodiments of the composite part program generator 10, the path generator 18 can analyze the manufacturing tool surface and ply definitions to generate the composite material application paths 30, while ensuring any gaps between or overlap of adjacent paths comply with the gap standard, or specification. The paths can be optimized in accordance with the shape of the overall surface, as well as local regions of the surface. In a preferred embodiment, the path generator 18 can perform a three-dimensional (3-D) analysis to generate the paths 30. However, in an alternative embodiment, the path generator 18 can perform a two-dimensional (2-D) analysis to generate the paths 30. Thus, the path generator 18 can populate the surface area of each ply with paths that are spaced apart by the nominal width of a standard composite material segment, such as a tape course, within a tolerance that complies with the gap or overlap specifications.

The path generator 18 can further define the individual composite material segments. For example, in a preferred embodiment of the invention, the path generator 18 can select an appropriate 2-D reference surface to represent the manufacturing tool surface, or the composite part surface, and initially lay out the composite material segments on the 2-D reference surface. For example, the path generator 18 can select a simplified surface, such as a cylinder, sphere or cone, that can be readily modeled by a mathematical function or a set of mathematic functions, project the manufacturing tool or composite part surface onto the simplified surface, and "unroll" or flatten out the simplified surface to create a planar reference surface upon which to lay out the composite material segments.

In the case of a tape lamination machine, the path generator 18 can define the individual tape courses 36, 38 based on the intersections of the paths 30 with the ply boundaries 32, 34.

These intersections can define tape cut patterns required to form the tape courses. In one embodiment of the composite part program generator 10, the tape cut patterns can be defined as butt cuts normal to the centerline of the tape courses 36, 38, while in other embodiments the tape cut patterns can be defined as more complex patterns, for example, consisting of a combination of line segments.

After laying out the composite material segments on the reference surface, the path generator 18 can transform or redefine the composite material segments in terms of the actual 3-D manufacturing tool or composite part surface. This transformation can be accomplished, for example, by applying a reverse function to the 2-D tape course data based on the function, or functions, used to create the reference surface from the actual manufacturing tool 28 or composite part surface. In addition, for each sequence of plies, the path generator 18 can update the surface definition to add the thickness of the composite material over each ply area of the sequence.

The paths 30 defined by the path generator 18 can be independent of any composite material application machine. Subsequently, the machine-independent paths 30 can be assigned to specific delivery heads of a specific type of composite material application machine by the course head manager 20 to generate machine-specific paths.

The course head manager 20 can receive the relatively complex three-dimensional (3-D) geometry of the composite material application paths 30 defined by the path generator 18 and check the paths 30 for errors, such as redundant points or the like. If errors are identified, the course head manager 20 can correct the errors, for example, removing redundant points. In addition, the course head manager 20 can analyze the 3-D geometry of each of the paths 30 to determine which, if any, of the paths 30 need to be assigned to specialized delivery heads.

In addition, the course head manager 20 can perform a machine-specific optimization algorithm to determine the most efficient composite material application head-to-path assignments, that is, the assignments that will result in the shortest production time required to manufacture the composite part. For example, the course head manager 20 can assign the paths to specific composite material application heads and specific passes of the tool carriage utilizing one of two optimization schema. In an embodiment, either one or the other optimization is performed based upon whether or not the machine includes a specialty head.

First, for machines with all standard heads, the course head manager 20 can arrange the heads in a fixed constellation configuration on the tool carriage, which can be moved over the surface. In this case, distinct constellation designs are required for each combination of ply orientation and tool-carriage direction of travel along the paths 30. In general, the constellation design is configured to increase efficiency by maximizing the number of heads that may be employed to apply tape to the mandrel. A more detailed description of constellation and constellation design is disclosed herein with reference to FIGS. 4 and 5. In addition, each head can be allowed to move relative to the constellation within a limited range to track the precise 3-D geometry of the corresponding path 30 over the surface. Furthermore, limitations or tolerances on movement of the individual composite material application heads within the constellation can prevent collisions between the composite material application heads, or between the composite material application heads and other machine structure.

Second, for machines having one or more specialized composite material application heads, the course head manager 20 can use "greedy optimization" to efficiently assign the paths 30 to the composite material application heads. That is, for each pass of the tool carriage, a maximum possible number of paths 30 is assigned to that pass, subject to two conditions: first, if possible, each special head can be assigned a path 30 requiring that head; second, whenever possible, a group of contiguous paths 30 are assigned to all composite material application heads, so as to not leave unassigned paths. In some cases, the unavailability of sufficient specialized heads can require that a path 30 requiring a specialized head remain unassigned between assigned paths. However, when possible, this is avoided because of the difficulty of efficiently filling in a skipped path on a later pass.

In some embodiments of the composite part program generator 10, the course head manager 20 can construct a 2-D representation based on the 3-D geometry of the paths 30 to create an ordered set of logical paths, and perform the head-to-path assignment analysis in the 2-D realm. In these embodiments, the course head manager 20 can later associate the 3-D paths with the respective 2-D composite material application head and tool carriage pass assignments. In other embodiments, the course head manager 20 can perform the head-to-path assignment analysis in the 3-D realm. Furthermore, the course head manager 20 can perform various cleanup tasks to organize the resulting data.

The resulting path and head assignment data can be used by the post-processor 22 to generate CNC part programs in machine code format that can be executed on a multihead composite material application machine, as well as on a conventional single-head composite material application machine. The post-processor 22 can provide the capability in post-processing for the programmer to manage composite material application head dynamics, such as approaching or departing the manufacturing tool or composite part surface, and starting, stopping and cutting the composite material. The post-processor 22 also allows the programmer to control machine axis accelerations and velocities, so as to improve or optimize an overall composite material application rate.

Initially, the post-processor 22 can receive the path data, including the path definitions as well as the head-to-path and carriage pass assignments. The post-processor 22 can add machine axis motion control data for approach of the composite material application heads to the manufacturing tool or composite part surface at the beginning of each tool carriage pass or composite material segment and departure of the composite material application heads from the surface at the end of each pass or segment. That is, for each composite material application head having a path assigned on a given tool carriage pass, the post-processor 22 can add an approach-to-surface definition, or motion profile, and a departure-from-surface definition, or motion profile. In some embodiments of the composite part program generator 10, the post-processor 22 can add a head approach profile and departure profile for each composite material application path 30. In other embodiments, the post-processor 22 can add a head approach profile and departure profile for each composite material segment along each of the paths 30.

Thus, for each composite material application path 30, or for each composite material segment along each path 30, the post-processor 22 can add machine axis motion control data for accelerating the corresponding head in advance, then momentarily decelerating the head, cutting a composite material end, starting a composite material feed, and accelerating the head to reposition the head in a nominal position relative to the tool carriage or constellation and match the tool carriage speed. This process, referred to as "add on the fly," can be synchronized so that the composite material end is placed in a precise location. For example, on a tape-laying machine, the "add on the fly" process can be synchronized such that the tape end passes under a corresponding head compaction device precisely at the location specified by the composite material segment definition, that is, in compliance with a specified composite material end placement tolerance.

Similarly, for each composite material application path 30, or for each composite material segment along each path 30, the post-processor 22 can add machine axis motion control data for accelerating the corresponding head in advance, then decelerating the head to momentarily match the velocity of the manufacturing tool surface, cutting a composite material end, stopping the composite material feed, and accelerating the head to reposition the head in a nominal position relative to the tool carriage or constellation. This process, referred to as "cut on the fly," can also be synchronized so that the composite material end is placed in a precise location. For example, on a tape-laying machine, the "cut on the fly" process can be synchronized such that the tape end passes under the corresponding head compaction device precisely at the location specified by the composite material segment definition, that is, in compliance with a specified composite material end placement tolerance. Furthermore, the "cut on the fly" process can include decelerating the head to momentarily maintain a fixed position with regard to the manufacturing tool or composite part surface to allow time for the composite material to be cut in place.

The "add on the fly" and "cut on the fly" motion profiles, as well as the approach-to-surface and departure-from-surface motion profiles, can be dynamic—that is, the motion profiles can vary depending on the length of the individual composite material segments and the respective distances between the composite material segments. Therefore, the post-processor 22 can further verify that the composite material application head approach and departure motion profiles, as well as the "add on the fly" and "cut on the fly" motion profiles, at all points define a continuous and smooth head motion, with regard to the absolute position of the corresponding composite material application head as well as the relative position of the head with respect to the tool carriage position. In addition, the post-processor 22 can verify that the approach, departure, "add on the fly" and "cut on the fly" motion profiles do not violate any requirements or specifications regarding the composite material application machine dynamics.

In some embodiments of the composite part program generator 10, the post-processor 22 can include in the approach-to-surface definition a specified location where a composite material applicator compaction device is to be activated, or "compaction on" location. Likewise, the post-processor 22 can include in the departure-from-surface definition a specified location where the composite material applicator compaction device is to be deactivated, or "compaction off" location. In other embodiments, the post-processor 22 can specify a "compaction on" location and a "compaction off" location for each composite material segment along each of the paths 30, for example, in the case of a composite tape-laying machine, for each tape course along each path 30.

Furthermore, the post-processor 22 can define a constellation pathway, or a sequence of constellation pathways. That is, the post-processor 22 can evaluate a group of material application paths 30 assigned to a single tool carriage pass and determine a median pathway relative to the group of paths 30. For example, the post-processor 22 can determine an ideal constellation pathway with regard to each composite material application head that has an assigned path for the tool carriage pass, and based on the set of ideal paths determine a median constellation pathway. The post-processor can further verify that each of the heads is able to reach all points of the corresponding path locations based on the constellation pathway.

Additionally, the post-processor 22 can extend the median pathway and define constellation start and end points for the pass—that is, the post-processor 22 can specify a location at which the composite material application heads can be set or positioned in a specific constellation configuration, and a location at which the composite material application heads can be reset or repositioned in a different constellation configuration. The post-processor 22 can further connect the sequential constellation pathways into a continuous chain of directional pathways, or a single continuous pathway.

Moreover, based on the paths 30 and the corresponding constellation pathway, the post-processor 22 can define a relative path for each composite material application head that has an assigned path. The relative paths relate the individual paths 30 to the constellation pathway. Accordingly, the post-processor can determine machine axis solutions to control the individual head movements with respect to the tool carriage based on the relative paths. For example, the post-processor 22 can implement classic machine kinematics logic to generate machine axis position solutions based on the constellation pathway points, the individual path points and the manufacturing tool surface or updated surface normal data. The machine axis solutions can be used to control the composite material application machine movements by way of servo motors, or any suitable actuator for producing composite material application head, tool carriage or manufacturing tool motion.

Since there is always at least one common machine axis direction of motion shared between all the composite material application heads, all head machine axes are interpolated as a group. However, existing CNC controllers do not have the capacity to interpolate a relatively large number of axes in a single interpolation group. Thus, in order to overcome existing CNC controller limitations on axis count, the post-processor 22, rather than the CNC controller, can calculate individual machine axis position, velocity, acceleration, and jerk or surge at all points. The post-processor 22 can further verify that the machine axis solutions do not violate the limitations or specifications of the machine and make minor adjustments to the machine axis solutions to produce smooth physical transitions, while maintaining accurate composite material application paths. Thus, the post-processor can closely synchronize the composite material application head machine axis solutions.

Based on the constellation pathway, the post-processor 22 can define a tool carriage route and a manufacturing tool, or mandrel, route. For example, the post-processor 22 can determine a sequence of directional passes of the tool carriage across the surface of the manufacturing tool or composite part, and a sequence of rotational or angular movements for a rotating mandrel or translational movements for a flat or contoured mandrel. Since the movement of the composite material application heads over the manufacturing tool or composite part surface depend on the relational position of the tool carriage with respect to the manufacturing tool, some movements of the composite material application heads over the manufacturing tool or composite part surface can be determined by changes in the tool carriage position, the manufacturing tool position, or both. Thus, the manufacturing tool route and the tool carriage route can be interdependent.

Accordingly, the post-processor 22 can synchronize the manufacturing tool route with the tool carriage route to determine an efficient or optimal combination of manufacturing tool and tool carriage movements to obtain the required relational positions based on the constellation pathway. That is, the post-processor 22 can implement classic machine kinematics logic to simultaneously generate machine axis solutions for the tool carriage and for the manufacturing tool in order to effect the constellation pathway. In addition, the post-processor 22 can closely synchronize the individual head machine axis solutions with the tool carriage and manufacturing tool machine axis solutions in order to maintain accurate composite material application head control.

In a preferred embodiment of the composite part program generator 10, a master-slave axis relationship across multiple distributed CNC controllers can be accommodated to manage the relatively large number of coordinated machine axes. For example, the multihead composite material application machine can be controlled by a master CNC controller and multiple slave CNC controllers. The master controller and the slave controllers can be networked together over a high-speed bus that can facilitate the exchange of relevant data between the various controllers during each interpolation cycle. Thus, the master controller can coordinate the individual CNC interpolation cycles.

For example, each of the CNC controllers can be configured with three process channels, each of which can have a permanent part program that executes cyclically during composite material application activities. The permanent part programs can be used, for example, to coordinate individual head motion when the head is not adjacent the manufacturing tool or composite part surface. In addition, the permanent part programs can be used to coordinate incremental background loading of curve table data into the individual controller memory and control the sequence of curve table engagement to the servo axes and auxiliary code data streams.

Furthermore, in order to increase the overall composite material application rate, the post-processor 22 can set a constellation rate, or the rate of motion of a master axis—which can correspond, for example, to the tool carriage motion, to the manufacturing tool motion, or to a combination of the tool carriage motion and the manufacturing tool motion—to one of several predetermined rates that correspond to various composite material application machine operations for each tool carriage pass. For example, in a preferred embodiment, the constellation rate can be adjusted to one of three basic rates, which correspond to composite material "add," "lay down," and "cut" machine operations. Generally, the constellation rate can be constrained by the worst case dynamics of any active composite material application head at any point in time of a tool carriage pass, allowing for acceleration and deceleration time.

In addition, the post-processor 22 can check machine axis limits for all composite material application head, tool carriage and manufacturing tool machine axes to verify that the machine axis limits are not exceeded at any time. Moreover, the post-processor 22 can check all composite material application head positions to ensure that the composite material application head paths of motion are collision-free. In addition, the post-processor 22 can calculate and report the total composite material usage for the composite part program.

Finally, the post-processor 22 can create an output file, or a set of output files, containing the results of the machine axis solutions in a data format that is compatible with the CNC controller used in conjunction with the specific composite material application machine. For example, in a preferred embodiment of the composite part program generator 10, the output file can be written in a unique curve table format that is compatible with the Siemens 840D CNC controller family. In some embodiments, an output file or a set of output files can be created for each tool carriage pass defined by the composite part program.

For example, for each tool-carriage pass, the post-processor 22 can produce a curve table file for each machine axis to provide positional data, such as linear interpolation coordinate-point pairs or polynomial function definitions, including the necessary master-slave relationships. Moreover, for each tool carriage pass, the post-processor 22 can produce an additional curve table file for each composite material application head to provide auxiliary code definitions, such as composite material feed control data, cutter control data, and so on. Thus, the post-processor 22 can create multiple, concurrent composite part programs for use with a CNC controller and a composite material application machine, such as a composite tape lamination machine or an automated fiber placement (AFP) machine to manufacture a composite part.

In some embodiments, the output file data format can be compatible with a master-slave CNC control scheme, such as that disclosed herein. For example, in a preferred embodiment, the Siemens 840D curve table format can implement the master-slave axis relationships of the multihead composite material application machine. This is made possible because the curve table can provide a mathematical definition between a leading variable and a slave variable that can be applied to both pairs of machine axes, in addition to conventional CNC control variables applied to each machine axis.

In a preferred embodiment of the invention, the post-processor 22 can create a supplemental output file, or a set of supplemental output files, in a data format that is compatible with the machine simulator 24. For example, the post-processor 22 can produce an output file containing a time-based sampling of the machine axis positional data for use by the machine simulator 24, which may not be capable of interpreting the composite part program, for example, in the Siemens 840D curve table format.

The machine simulator 24 can receive the output file or the supplemental output file and simulate the composite material application machine operations, including multiple composite material application heads with multiple machine axes. For example, the machine simulator 24 can model the physical machine, replicate the CNC controller functions, and produce cycle information in order to facilitate machine collision avoidance and process refinement. Thus, the machine simulator 24 can eliminate waste and increase the economic value of the CNC manufacturing process.

During the development of a composite part program, prior to running the program on an actual composite material application machine, the composite part program, or the supplemental equivalent, can be simulated by the machine simulator 24 to verify that the composite part program does not contain errors, in particular, positional errors that potentially could damage the machine, such as collisions between the composite material application heads or between an individual composite material application head and other machine structures.

The machine simulator 24 can provide user feedback, for example, by way of a graphic display or via caution messages. The machine simulator 24 can function as an interactive, 3-D simulation environment. Thus, the machine simulator 24 can provide for visualization and analysis of the functionality—for example, a composite material application or removal process—of the physical machine, including a CNC controller. The machine simulator 24 can enable the user to improve the quality or efficiency of the composite part program, eliminate catastrophic program errors, and optimize machining processes.

For example, in a preferred embodiment of the invention, the machine simulator 24 can be based on the DELMIA VNC simulation system, manufactured by Dassault Systemes S.A.

of Suresnes, France. However, an existing version of DELMIA VNC is limited to simulating eighteen or fewer axes of machine motion in a synchronized simulation mode. In order to support simulation of a larger number of axes, each composite material application head can be defined as a separate, or independent, device having five axes. The individual composite material application heads can be synchronized in the simulation by simulating digital communication (I/O) signals between the devices. This simulation process can enable the synchronized simulation of a larger number of axes; for example, a machine with forty-two axes has been simulated in synchronized mode using this process.

Laminating devices that generally include multiple dispensing heads and, more particularly, multi-head tape lamination machine (MHTLM) technology provides the potential of significantly increasing the composite tape lay-down rate. However, without adequate simulation and modeling, optimizing head configurations, paths, and the like, is an expensive and time consuming problem. The rate simulator 23 includes a discrete event simulation program that mimes the functions of a proposed MHTLM and predicts its potential performance. The rate simulator 23 provides detailed statistics of a particular MHTLM and head assignment algorithm for design engineers and other users. The rate simulator 23 allows prediction and verification of the performance of a proposed MHTLM design and head assignment algorithm without actual construction. That is, hypothetical MHTLM designs may be tested and an extensive trade study of the different designs is made possible. This can significantly reduce the cost and time of development and assist in the design of an optimal MHTLM configuration as well as an optimal head assignment algorithm. The rate simulator 23 also generates a collection of valuable head and path operation statistics for design engineers to use in constructing the hardware.

The rate simulator 23 is configured to simulate flat, cylindrical, and/or irregular geometry as used by MHTLM, contour tape lamination machine (CTLM), flat tape lamination machine (FTLM), or any known fiber placement machine. Structural data of a particular MHTLM design and/or a particular tool is used to generate a representative system model. By changing the design parameters, an extensive trade study of many MHTLM designs is possible. Given the targeted ply data, the rate simulator 23 estimates material lay-down rates of a particular design and report various detailed statistics data of various aspects of the performance. The detailed visual presentation of the simulation process also enhances the power of the rate simulator 23. That is, by viewing a simulated image and/or movie of the MHTLM design fabricating the given composite item, design engineers and other users are provided information that allows for fast and efficient identification of potential problems. In addition, information in this format provides a powerful marketing tool for users more familiar with visual media.

Figure 3:
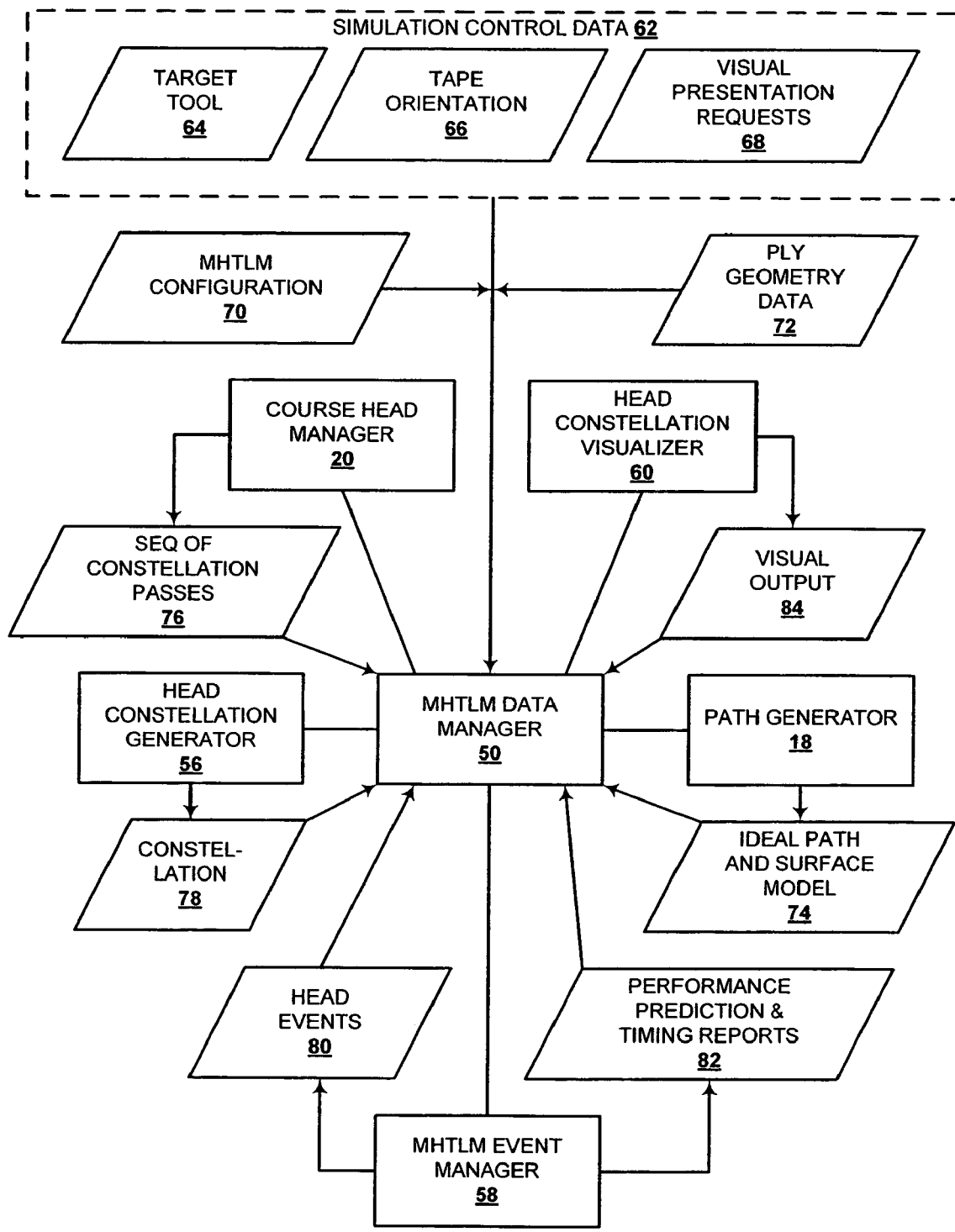
FIG. 3 is a block diagram of a system architecture for a head assignment and simulation module according to an embodiment of the invention.

FIG. 3 is a block diagram of a system architecture for the machine simulator 24 according to an embodiment of the invention. As shown in FIG. 3, the machine simulator 24 includes an MHTLM data manager 50, path generator 18, course head manager 20, head constellation generator 56, MHTLM event manager 58, and head constellation visualizer 60.

The MHTLM data manager 50 accesses and forwards data, as appropriate, to the various other modules of the machine simulator 24. For example, the MHTLM data manager 50 accesses a simulation control data set 62. The simulation control data set 62 includes a target tool data file 64, tape orientation data file 66, and visual presentation request data file 68. In addition, the MHTLM data manager 50 accesses a MHTLM configuration file 70 and ply geometry data file 72. The MHTLM data manager 50 further communicates with the path generator 18, course head manager 20, head constellation generator 56, MHTLM event manager 58, and head constellation visualizer 60 and provides these modules with requested data as appropriate.

The taping process for a given ply geometry is divided into a series of tape paths upon which tape is applied by the MHTLM. The machine simulator 24 receives a set of ideal paths that have been calculated by the path generator 18 and are based on a numeric representation of the manufacturing tool 28 and the tape to be applied. The path generator 18 calculates paths for application of the tape on the composite item. For example, given an essentially cylindrical composite item such as that formed on the manufacturing tool 28 of FIG. 2, the path generator 18 may calculate an equivalent 2 dimension space corresponding to the surface of the manufacturing tool 28. Given the ply geometry data 72 (in nested polygons, for example) and tape orientation data file 66, the path generator 18 calculates the paths covering the targeted plies in an appropriate tape width. The calculated paths are typically referred to as "ideal" paths. This information is utilized to generate an ideal path and surface model 74. In other examples, the path generator 18 may calculate paths for flat, contoured, and/or irregular surfaces.

Figure 5:
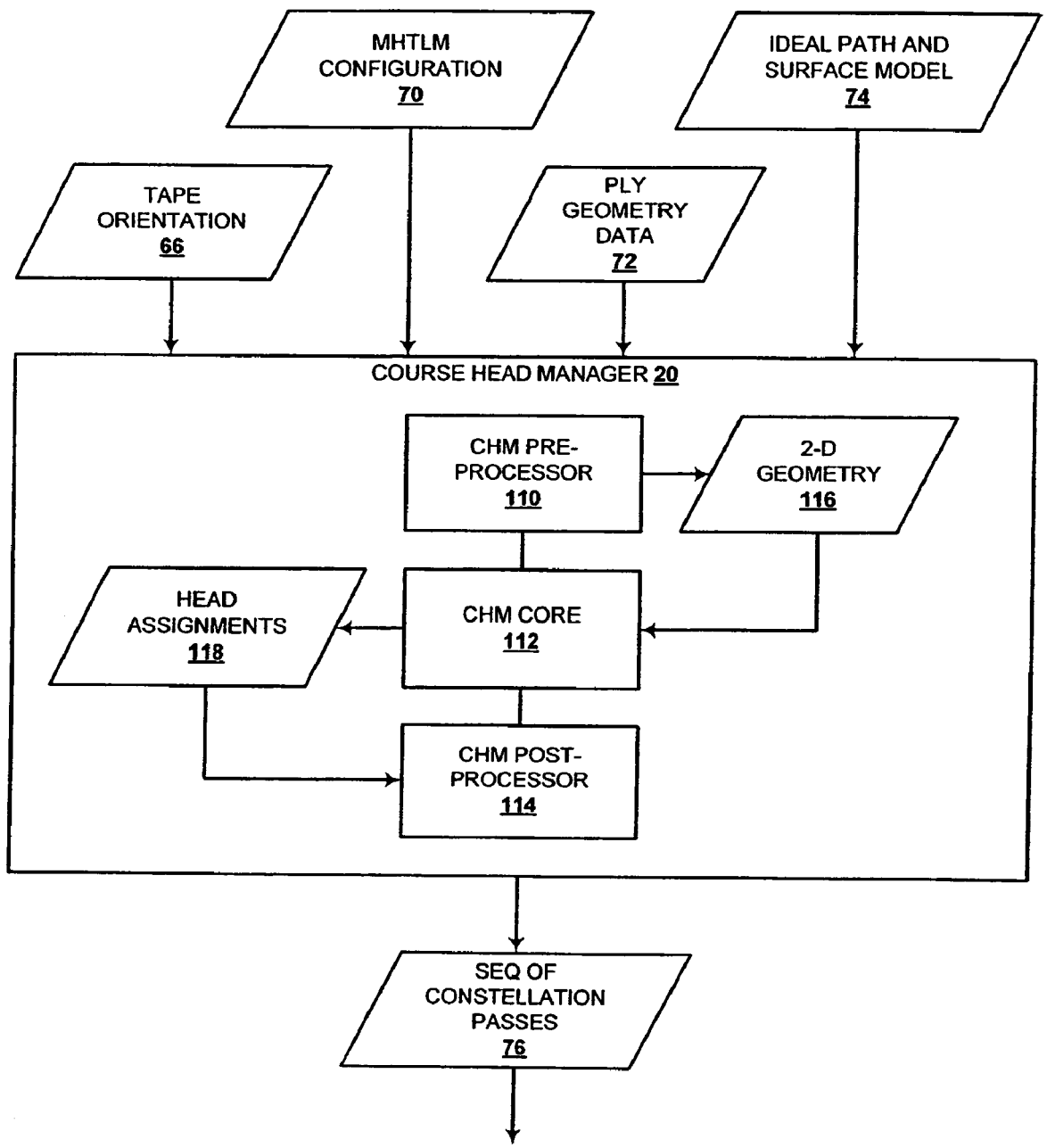
FIG. 5 is a system diagram of a course head manager for assigning delivery heads to respective courses in accordance with an embodiment of the invention.

As described in FIG. 5, the course head manager 20 generates a sequence of "constellation" passes. A constellation is an arrangement of relative head locations. In an embodiment, the relative arrangement of head locations is essentially fixed for a given constellation. This arrangement is configured to satisfy the constraints imposed by the MHTLM with respect to where heads can be placed without interfering with each other, with the structure of the MHTLM, and/or with the structure of the manufacturing tool 28. Separate constellation designs may be generated for some or each combination of ply angle and direction of travel (forward or backward along the path), and when an aspect of the MHTLM and/or manufacturing tool 28 configuration is changed.

Given the ideal path and surface model 74, ply geometry data 72, and the tape orientation data file 66, the course head manager 20 generates a sequence of the constellation passes file 76. For each pass, the heads are assigned to particular path. The moving direction of the whole constellation for this pass is also assigned.

The head constellation generator 56 determines a head constellation for a given set of parameters. More particularly, given the tape orientation data file 66 and the MHTLM configuration file 70, the head constellation generator 56 calculates a constellation consistent with the head assignment need for the orientation specified. This information is stored to a constellation data file 78.

The MHTLM event manager 58 includes 2 modules, a movement module 58A that determines specific movements of the heads and a timing module 58B that generates performance predictions and timing reports. Head movements or head events generally include head rotations in the various axes, tape add and cut events, and the like. For example, when the head constellation is moving through the assigned paths on each pass, the tape head will rotate as appropriate, perform add and/or cut actions and lay down the tape upon the specified area. The movement module 58A generates the event for each head for the various actions that occur during the particular path. After the computation of these events for the whole head constellation is completed for a particular pass, the timing module 58B merges and sort the various events and calculate the time elapsed to perform the pass. The timing module 58B also collects a variety of suitable data from each event for later reporting. Examples of such suitable data include tape usages, special path info, and the like. At the end of the taping process of a given ply, the timing is recorded. A summary of the data from these events is output as a head events file 80 and/or a performance prediction & timing report file 82. These reports may be evaluated by engineers or other users, for example.

The head constellation visualizer 60 generates visual media based on associated numeric models and/or movement calculations. The head constellation visualizer 60 receives the various data files, models, and/or events from the MHTLM data manager 50 to generate 2D and/or 3D images, and/or video of the taping process in the form of a visual output file 84. The visual output file 84 from the head constellation visualizer 60 may be viewed in any suitable format. The head constellation visualizer 60 may further be configured to modify viewing angle, distance, 3D-lighting, and display simulation time.

FIG. 3 is also a block diagram a system architecture for the rate simulator 23 according to an embodiment of the invention. The rate simulator 23 includes a system architecture that is broadly similar to the machine simulator 24 and thus, for the purpose of brevity, only those elements that differ will be described hereinbelow. A difference between the two is that the rate simulator 23 utilizes relatively less detailed data than does the machine simulator 24. More particularly, the rate simulator utilizes preliminary data generated by the path generator 18, course head manager 20, and head constellation generator 56. It is an advantage of the rate simulator 23 that predictive results based upon the less detailed data may be generated more rapidly. The rapid generation of multiple configurations provides engineers with the opportunity to test multiple 'what if' scenarios and thereby optimize the fabrication process. In practice, the rate simulator 23 may be utilized relatively early in the constellation design process to identify promising configurations. These promising configurations may be utilized subsequently as the starting point of further analysis.

Figure 4:
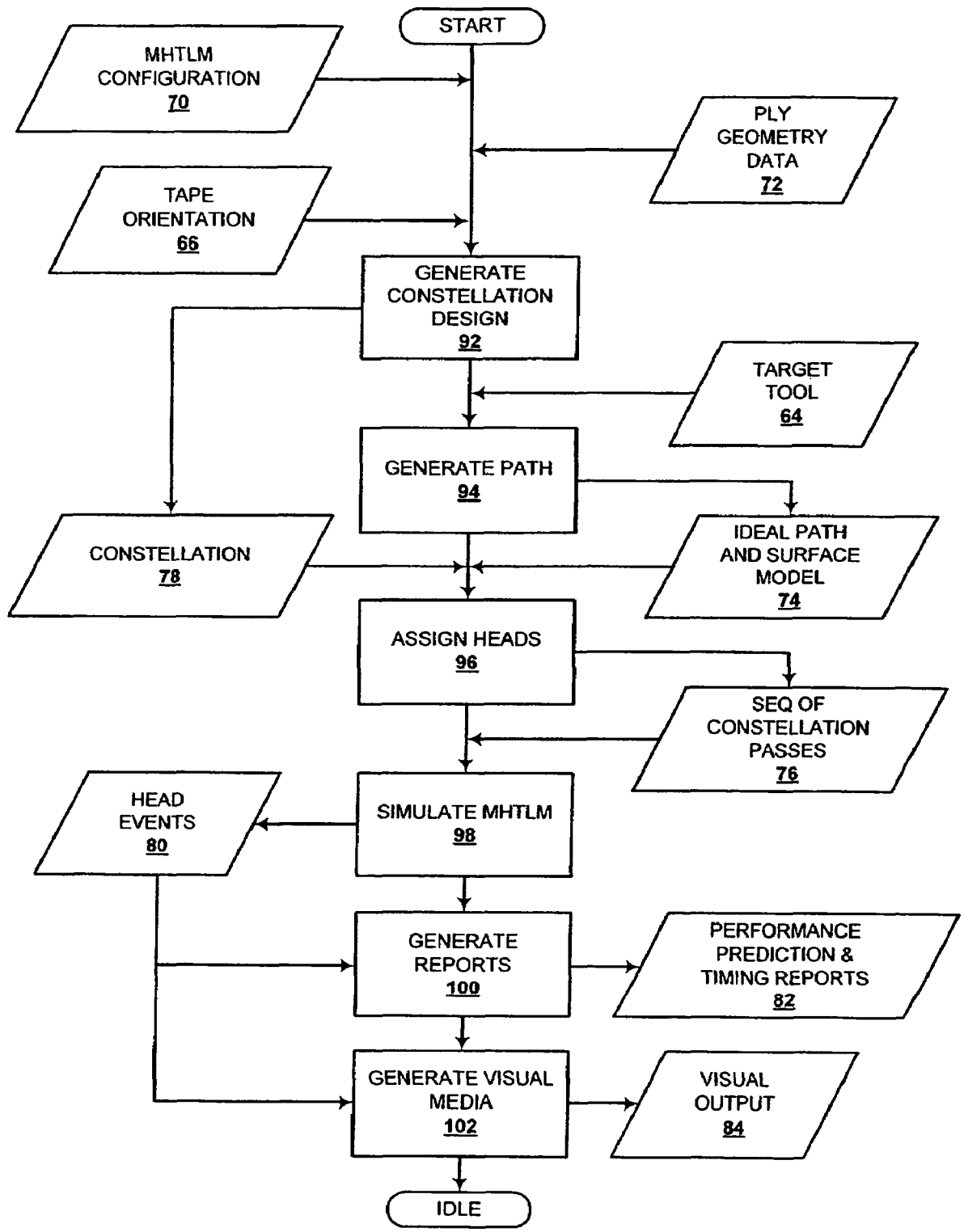
FIG. 4 is a flow diagram illustrating steps that may be followed to assign and simulate head movements in accordance with the embodiment of FIG. 3.

FIG. 4 is a flow diagram of a method 90 illustrating steps that may be followed to assign and simulate head movements in accordance with the embodiment of FIG. 3. As shown in FIG. 4, the method 90 is initiated by generating the constellation 78 at step 92. The constellation 78 is generated at step 92 by the head constellation generator 56 in response to receiving the MHTLM configuration file 70, ply geometry data file 72, and tape orientation data file 66.

At step 94, the ideal path and surface model 74 is generated by the path generator 18 in response to receiving the target tool data file 64.

At step 96, the sequence of the constellation passes file 76 is generated by the course head manager 20 in response to receiving the ideal path and surface model 74 and constellation data file 78.

At step 98, the head events file 80 is generated by the MHTLM event manager 58 in response to receiving the sequence of the constellation passes file 76.

At step 100, the performance prediction & timing report file 82 is generated by the MHTLM event manager 58 in response to receiving the head events file 80.

At step 102, the visual output file 84 is generated by the head constellation visualizer 60 in response to receiving the head events file 80.

Following the method 90, the machine simulator 24 may idle or stop until the method 90 is initiated again.

FIG. 5 is a system diagram of the course head manager 20 for assigning delivery heads to respective courses in accordance with an embodiment of the invention. In general, the course head manager 20 is configured to maximize efficiency and/or the lay-down rate of the MHTLM. The MHTLM includes a carriage to support the multiple heads. Each time this carriage traverses from one end of the manufacturing tool to the other end, the carriage is said to have made a pass. Ideally, all of the heads will be dispensing tape during the pass. In general, by increasing head assignment efficiency, the total number of passes required to fabricate the composite item may be reduced. Efficiency is defined as the average percentage of heads that are laying tape at any particular time as compared the total number of heads. However, in some cases this is not appropriate, for example when the width of a ply is not wide enough for all the heads to apply tape.

In addition, to maximize the tape lay-down rate, it is desirable to use relatively wide tape whenever possible. However, in some cases this is not appropriate, for example when the width of a ply is not a multiple of the wide tape width, or when surface curvature would induce wrinkles in wide tape. Therefore, the course head manager 20 accommodates heads that may include a variety of head characteristics and that may be dispensing tape that includes a variety of tape characteristics. In general, head characteristics include constraints or capabilities of the particular head. Examples of head constraints and/or capabilities include one or more of: tape width dispensing capabilities; head clearance requirements; dimensions of each ply; cut angle, such as, butt, taper, etc.; head size; range of movement; number of tows per head; and the like. Tape characteristics include width, thickness, stiffness, in-plane curvature and/or slope discontinuity capabilities, material constituents, and the like. In addition the course head manager 20 may accommodate for a variety of other head and tape characteristics.

As shown in FIG. 5, the course head manager 20 includes a course head manager (CHM) pre-processor 110, course head manager (CHM) core 112, and course head manager (CHM) post-processor 114.

In an embodiment, the course head manager 20 utilizes a 2D logical arrangement of tape paths, rather than a 3D representation of the paths. The CHM pre-processor 110 accesses the relatively complex 3D paths defined by the path generator 18, checks for and corrects errors such as, for example, removing redundant points and the like, and generates a file 116 that includes the logical 2D paths that is utilized by the CHM core 112. To reduce the complexity of this 2D logical arrangement, each path may be assumed to be essentially the same width (nominal tape width+nominal commanded gap). In addition, the CHM pre-processor 110 performs various tests on the 3D paths to determine which paths may be assigned to specialized heads. To reduce the complexity of head assignment, each path may be assigned to a single tape head on any given pass.

The paths produced by the path generator 18 includes a collection of tape courses such as the tape courses 36. A course is a segment of tape that is to be laid. Each course references a path, which is the 3D path that a tape centerline would take across the manufacturing tool 28 or mandrel surface. Typically, each path supports 1 to 4 courses; however the associativity is course to path, not path to course. Some paths may have no courses greater than the minimum length that can be laid, and hence may be considered empty paths.

The CHM pre-processor 110 groups tape courses provided by the path generator 18 into their associated paths, and sorts the paths in order (left-to-right, top-to-bottom), using sorting algorithms that employs cylindrical coordinates and/or Cartesian coordinates. The CHM core 112 determines the paths based upon the path ordering, together with the associated nominal path widths. As such, empty paths may be preserved in the logical structure if they modify the geometry. For example, empty paths that separate non-empty paths may modify the structure or arrangement of paths.

In addition, the CHM pre-processor 110 determines whether the tape courses comply with a predetermined set of parameters based upon factors such as, for example, tape characteristics, head characteristics, curvature of the manufacturing tool 28, and the like. More particularly, the CHM pre-processor 110 may determine whether each tape course includes a substantially constant, full width of tape. The CHM pre-processor 110 may further determine whether in-plane curvature and/or slope discontinuity of each tape course exceeds a predetermined threshold across the length of the course. If these or other parameters are determined to exceed the respective threshold values, the CHM pre-processor 110 may mark the particular course and/or other courses making up the ply to indicate the use of a specialized head. In this manner, the CHM pre-processor 110 may reduce or eliminate wrinkling of the applied tape or other such potential problems.

The CHM core 112 generally assigns the logical tape paths to specific heads on specific passes of the tool carriage. Mathematically speaking, proving that one particular head assignment is more efficient than any other possible head assignment is a computationally intractable problem. Therefore, an embodiment of the CHM core 112 includes a combination of heuristics and small-scale optimization to determine head assignments. In addition, the CHM core 112 factors in the types of MHTLM configurations being utilized during the determination process. These MHTLM configurations generally include: laminating machines that only include standard heads or only include one type of head; and laminating machines that include at least one special head.

The CHM core 112 is configured to utilize the concept of a constellation to determine head assignments for laminating machines that only include one type of head or standard tape heads, each of the heads may apply tape to any path. A constellation is an arrangement of head locations that remains relatively fixed during a pass. The CHM core 112 determines or selects a particular constellation that satisfies the constraints imposed by the MHTLM with respect to where heads can be placed without interfering with each other, the structure of the MHTLM, and/or the manufacturing tool 28. Furthermore, the particular constellation selected by the CHM core 112 is configured to satisfy these constraints when individual head positions are modulated within a pre-defined budget along each axis. These pre-defined budgets are set so as to allow individual heads to follow the precise 3D geometry of their assigned paths on the surface of the manufacturing tool 28. Moreover, the particular constellation selected by the CHM core 112 may provide 100% efficiency on full plies. Full plies are defined as those plies that cover the entire surface of the manufacturing tool 28. In an embodiment, this is accomplished by constructing the constellation so that a small number of passes with the same constellation covers a contiguous block of paths, with essentially every head working all the time.

In an embodiment, for each combination of ply angle and direction of travel (forward or backward along the path), a corresponding constellation is calculated or selected. For example, when essentially any aspect of the overall machine configuration is changed, the corresponding constellation is modified accordingly.

In an embodiment, the CHM core 112 is configured to optimize the head assignment for any specialty heads present. For example, the CHM core 112 may utilize "greedy" optimization for laminating machines with one or a few specialty heads with the remainder being standard heads. That is, the CHM core 112 is configured to bias the assignment of any specialty heads present such that, each specialty head is assigned to a path requiring the specialty head whenever possible. In a particular example, the CHM core 112 calculates head assignments using the following conditions, in order of decreasing priority: 1) no path has already been assigned to a previous pass; 2) each special head is assigned a path requiring that head, if possible; 3) gaps in the head assignment are avoided, unless required by the unavailability of enough special heads. A "gap" is defined herein as a single unassigned non-empty path surrounded by assigned paths. The CHM core 112 is configured to reduce the instances of gaps because they are usually difficult to fill efficiently on a later pass.

The CHM core 112 may further generate a head assignment file 118 that includes the head assignments. The CHM post-processor 114 accesses the head assignment file 118 and the ideal path and surface model 74 and generally associates the 3D tape paths with their respective assignments. In addition, the CHM post-processor 114 performs various cleanup tasks and writes APT source code that can be read by the NC post. This information is utilized to generate the sequence of constellation passes file 76.

An advantage of the course head manager 20 is a significant reduction in user time and expense when setting up the fabrication of a composite item. To date, there is no computerized system capable of assigning paths to a multiple delivery head lamination machine such as the MHTLM. As such, in conventional systems, an engineer or other user must expend a great deal of time to manually determining head assignments. Any errors in these assignments may result in lay-down inefficiencies and/or damage to the MHTLM and/or the manufacturing tool. In this regard, another advantage of the course head manager 20 that lay-down efficiencies are improved and assignment errors are reduced. For example, the course head manager 20 may take more factors, constraints, and/or capability into account more quickly and accurately than is possible for the user.

It is yet another advantage of the course head manager 20 that the head assignments may be modeled and/or simulated and displayed in visual format for the user to evaluate. That is, after determining a viable head assignment, rendered still images and/or movies may be displayed to the user by the head constellation visualizer 60, for example. In this manner, the user is provided with a relatively fast and efficient product to evaluate the head assignment.

Figure 6:
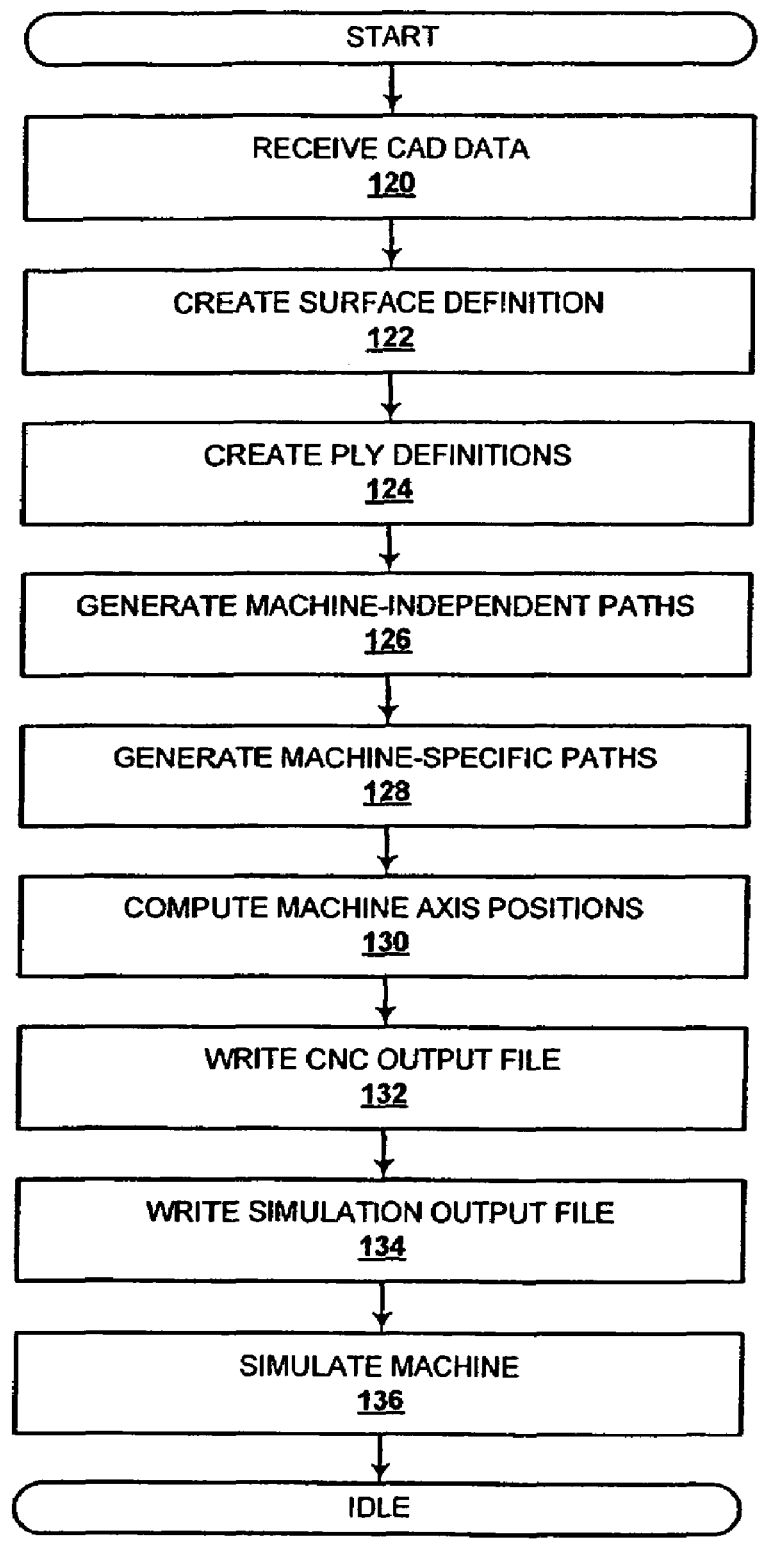
FIG. 6 is a flow diagram illustrating steps that may be followed to generate machine-independent paths in the method FIG. 5.

FIG. 6 is a flowchart illustrating a sequence of steps that can be performed in order to generate a composite part program. The process can begin by proceeding to step number 120, "Receive CAD Data," in which a composite part program generator can receive a composite part definition from a CAD system and convert the received composite part definition data format, which may be unique to the specific CAD system, into a format that is compatible with a path generator. For example, as explained above, in step 122, "Create Surface Definition," the composite part program generator can create a first data file containing the complete surface definition of a manufacturing tool or of a composite part, and in step 124, "Create Ply Definitions," the composite part program generator can create a second data file containing ply definitions for the various plies that form the composite part.

The process can then continue to step 126, "Generate Machine-Independent Paths," where the composite part program generator can define paths, as described above, which the composite material application heads associated with a composite material application machine can follow to apply a composite material over the manufacturing tool surface, or over a previous ply surface, in order to form the composite part. As further described above, the composite part program generator can use the manufacturing tool surface and ply boundary definitions created in steps 122 and 124 to generate the paths. In addition, as explained above, in the case of a tape-laying machine, individual tape courses can be defined based on the intersections of the paths with the ply boundaries.

Figure 7:
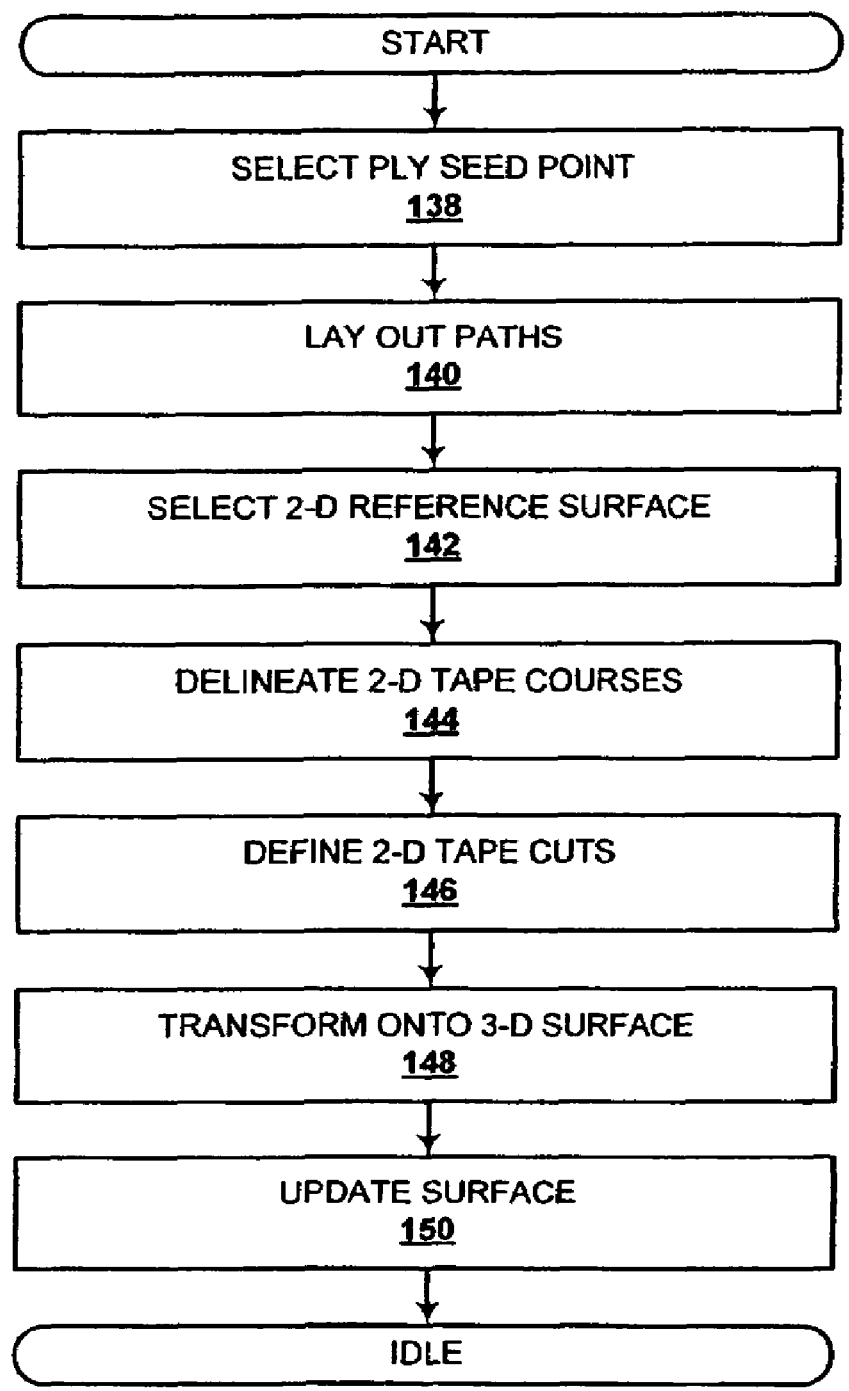
FIG. 7 is a flow diagram illustrating steps that may be followed to generate machine-specific paths in the method of FIG. 5.

FIG. 7 is a flowchart illustrating a sequence of detail steps that can be performed in order to generate machine-independent paths in step 126. Based on the manufacturing tool surface definition, in step 138, "Select Ply Seed Point," the composite part program generator can select an appropriate starting point within a ply boundary on the 2-D surface at which to begin path generation for a given ply. This selection can be performed for each defined ply of a sequence.

Next, in step 140, "Lay Out Paths," based on the surface definition and ply definitions, the composite part program generator can lay out parallel paths on the reference surface to cover the entire surface based on a nominal width of the composite material, taking into account any desired gap between the pieces of material. As explained above, the composite part program generator can analyze the manufacturing tool surface and ply definitions to generate the composite material application paths, while ensuring any gaps between or overlap of adjacent paths comply with the gap standard, or specification. The paths can further be optimized in accordance with the surface shape.

Then, in step 142, "Select 2-D Reference Surface," the composite part program generator can determine an appropriate two-dimensional reference surface to represent the manufacturing tool surface or the composite part surface. For example, the composite part program generator can select a simplified surface that can be readily modeled by a mathematical function or a set of mathematic functions to represent the more complex manufacturing tool of composite part surface. In this case, the manufacturing tool or composite part surface can be projected onto the simplified surface, and the simplified surface can be "unrolled" or flattened out to create a representative 2-D surface upon which to initially lay out the paths.

In the case of a composite tape lamination machine program, based on the intersections between the ply boundaries and the paths, in step 144, "Delineate 2-D Tape Courses," the composite part program generator can delineate two-dimensional tape courses corresponding to each path within the boundaries of each ply of the sequence. In step 146, "Define 2-D Tape Cuts," the composite part program generator can further delimit the precise tape cut patterns required to form the individual tape courses based on the intersections of the ply boundaries and the paths.

After laying out the 2-D courses, in step 148, "Transform onto 3-D Surface," the composite part program generator can redefine the paths in terms of the actual 3-D manufacturing tool or composite part surface. As explained above, this transformation can be accomplished, for example, by applying a reverse function to the 2-D data based on the function used to create the reference surface. Finally, in step 150, "Update Surface," the composite part program generator can update the surface definition to add the thickness of the composite material added to each ply area of the sequence, so that the 3-D paths and tape courses defined for the subsequent sequence can be located over the surface of the current sequence.

Referring again to FIG. 6, after the machine-independent paths have been generated in step 126, control can pass to step 128, "Generate Machine-Specific Paths," in which the composite part program generator can assign the machine-independent paths to specific delivery heads associated with specific tool carriage passes of a specific type of composite material application machine to generate machine-specific paths. As described above, the composite part program generator can perform machine-specific optimization to determine the most efficient composite material application head-to-path assignments.

Figure 8:
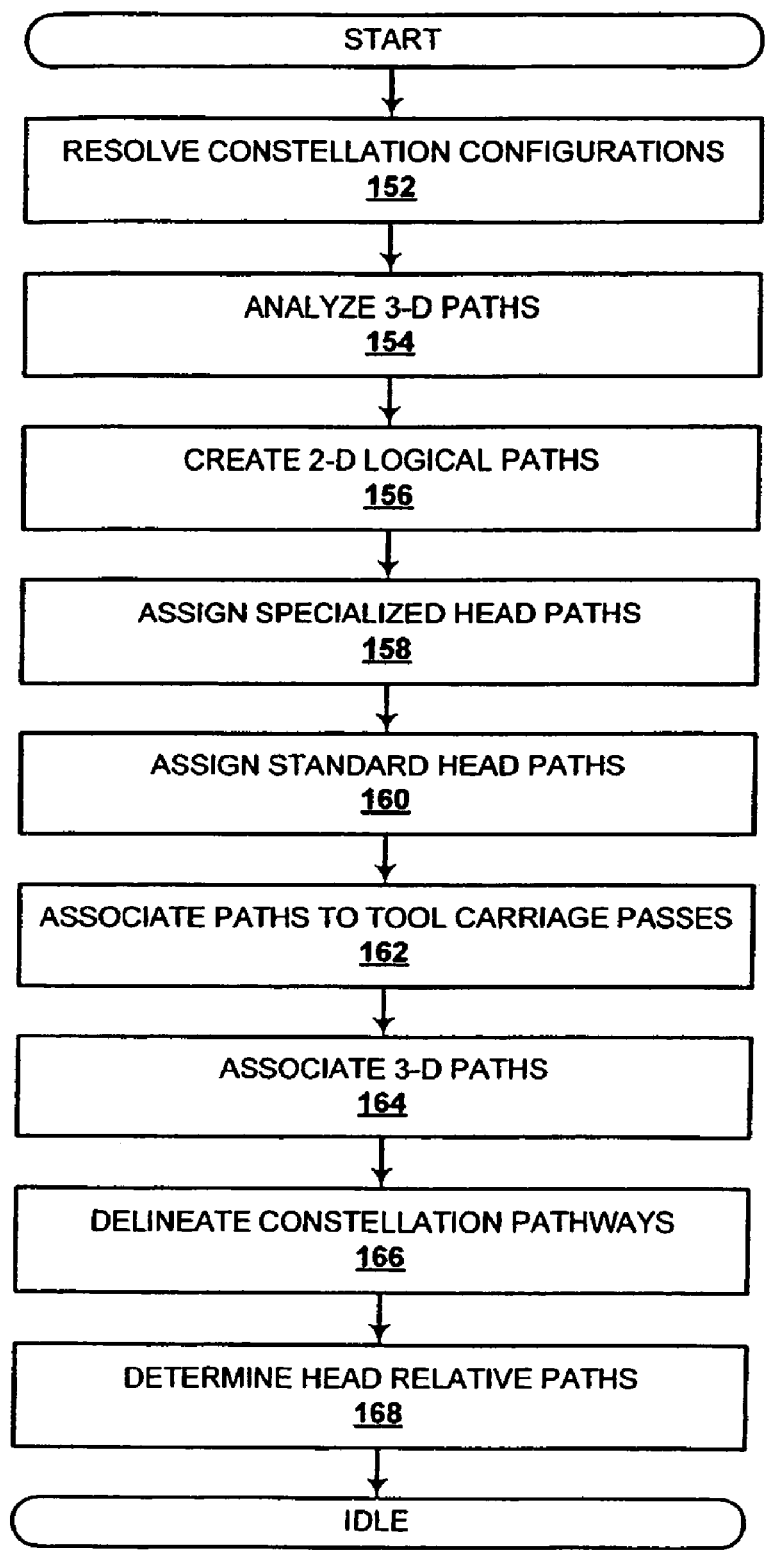
FIG. 8 is a flow diagram illustrating a sequence of detail steps that can be performed in order to generate machine-specific paths in accordance with FIG. 7.

FIG. 8 is a flowchart illustrating a sequence of detail steps that can be performed in order to generate machine-specific paths in step 128. Based on the defined ply orientations and the directions of travel of the tool carriage relative to the manufacturing tool surface (in each of two directions along the corresponding paths), in step 152, "Resolve Constellation Configurations," the composite part program generator can define composite material application head constellation configurations corresponding to each combination of ply orientation, or fiber orientation, and tool carriage direction of travel.

Then, in step 154, "Analyze 3-D Paths," the composite part program generator can analyze the 3-D geometry of each of the machine-independent paths to determine which, if any, of the paths require a special function of a specialized delivery head. Next, as further explained above, in step 156, "Create 2-D Logical Paths," the composite part program generator can construct a 2-D representation based on the 3-D geometry of the paths to create an ordered set of logical paths with equal spacing.

Subsequently, in step 158, "Assign Specialized Head Paths," the composite part program generator can perform machine-specific optimization to determine the most efficient composite material application head-to-path assignments, and assign the paths that require special composite material application head functions to specific specialized heads of specific passes of the tool carriage. As described above, the composite part program generator can apply "greedy optimization" to determine the most efficient assignment of the specialized heads.

Then, in step 160, "Assign Standard Head Paths," the composite part program generator can perform further machine-specific optimization and assign paths to the standard composite material application heads. Next, in step 162, "Associate Paths to Tool Carriage Passes," the composite part program generator can assign, or associate, each of the paths to a specific tool carriage pass over the manufacturing tool surface. In some embodiments, steps 158, 160 and 162 can be synchronized, for example, by an iterative repetition of the individual steps, to produce the most efficient overall assignment of composite material application heads. After determining the head-to-path assignments, in step 164, "Associate 3-D Paths," the composite part program generator can associate the 3-D paths with the respective 2-D composite material application head and tool carriage pass assignments.

Subsequently, in step 166, "Delineate Constellation pathways," the composite part program generator can delineate a constellation pathway. For example, as explained above, the composite part program generator can determine an ideal constellation pathway with regard to each composite material application head that has an assigned path for the tool carriage pass, and based on the set of ideal paths determine a median constellation pathway, and connect the resulting constellation pathways into a continuous chain of directional pathway, or a single continuous pathway. Then, in step 168, "Determine Head Relative Paths," the composite part program generator can define a relative path for each composite material application head relating the individual paths to the constellation pathway.

Referring again to FIG. 6, control passes to step 130, "Compute Machine Axis Positions," in which the composite part program generator can determine machine axis solutions to control the individual head movements with respect to the tool carriage based on the relative paths, to control the tool carriage movements, and to control the manufacturing tool movements. For example, as described above, the composite part program generator can implement classic machine kinematics logic to generate composite material application head machine axis position solutions based on the constellation pathway points, the individual path points and the manufacturing tool surface or updated surface normal data. Thus, as explained above, the machine axis solutions for the composite material application head, the tool carriage and the manufacturing tool can be closely synchronized. In addition, the composite part program generator can verify that the machine axis limits are not exceeded at any time, and check all composite material application head positions to ensure that the head paths of motion are collision-free.

Next, in step 132, "Write CNC Output File," as explained above, the composite part program generator can create a composite part program comprised of a set of output files containing the results of the machine axis solutions in a data format that is compatible with the CNC controller used in conjunction with the specific composite material application machine, for example, in the Siemens 840D curve table format. Next, in step 134, "Write Simulation Output File," the composite part program generator can optionally create a set of supplemental output files containing a time-based sampling of the machine axis positional data in a simulation data format.

Later, in step 136, "Simulate Machine," the composite part program generator can simulate the composite material application machine operations, including multiple composite material application heads with multiple machine axes. For example, as described above, the composite part program generator can model the physical machine, replicate the CNC controller functions, and produce cycle information in order to facilitate machine collision avoidance and process refinement.

FIGS. 1, 3, 4, 5, 6, 7, and 8 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 28, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection. In one embodiment of the present invention, the document collection includes documents received over the Internet. Other embodiments are possible, including: a local document collection, i.e., all documents on one computer, documents stored on a server or a client in a network environment, etc.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer readable medium on which is embedded computer software comprising a set of instructions for executing a method of modeling head assignments for a multihead composite material application machine having a set of heads, the method comprising:
    receiving a ply geometry for a composite part;
    receiving a configuration for the multihead composite material application machine having a common movable tool carriage, each one of the heads of the set of heads being mounted to the common movable tool carriage;
    generating a constellation of head locations in response to the ply geometry and the configuration for the multihead composite material application machine;
    assigning ones of the head locations of the constellation of head locations to corresponding ones of the heads of the set of heads, each one of the heads being movable relative to the constellation; and
    generating a graphical model of the multihead composite material application machine applying composite material upon the composite part in response to the assigned head locations.

2. The computer readable medium according to claim 1, the method further comprising:
    receiving a target tool file corresponding to the composite part.

3. The computer readable medium according to claim 2, the method further comprising:
    generating a path and a target tool surface model in response to receiving the target tool file.

4. The computer readable medium according to claim 3, the method further comprising:
    generating a sequence of constellation passes in response to receiving the constellation of head locations, the path and the target tool surface model, wherein the sequence of constellation passes includes a corresponding constellation of head locations for each pass of the multihead composite material application machine along the target tool surface model.

5. The computer readable medium according to claim 4, the method further comprising:
    generating a set of head events in response to the sequence of constellation passes, wherein the set of head events includes movement instructions for the set of heads.

6. The computer readable medium according to claim 5, the method further comprising:
    generating a performance prediction report in response to receiving the set of head events.

7. The computer readable medium according to claim 5, the method further comprising:
    generating a video of the multihead composite material application machine applying composite material upon the target tool surface model in response to receiving the set of head events.

8. A system for modeling head assignments of a multihead composite material application machine having a set of heads, the system comprising:
    a memory;
    a processor containing computer-executable instructions that, when executed on the processor, perform a method comprising the steps of:
        generating a constellation of head locations in response to receiving a ply geometry and a configuration for the multihead composite material application machine having a common movable tool carriage, each one of the heads of the set of heads being mounted to the common movable tool carriage;
        assigning a head location of the constellation of head locations to a corresponding head of the set of heads, each one of the heads being movable relative to the constellation; and
        generating a graphical model of the multihead composite material application machine applying composite material upon a composite part in response to receiving the assigned head locations.

9. The system according to claim 8, further comprising:
    a data manager to receive data from a set of components of the system and to forward data to the set of components.

10. The system according to claim 8, further comprising:
    a path generator to generate a path and a target tool surface model in response to receiving a target tool file corresponding to the composite part.

11. The system according to claim 10, further comprising:
    a head assignment manager to generate a sequence of constellation passes in response to receiving the constellation of head locations, the path and the target tool surface model, wherein the sequence of constellation passes includes a corresponding constellation of head locations for each pass of the multihead composite material application machine along the target tool surface model.

12. The system according to claim 11, further comprising:
    an event manager to generate a set of head events in response to the sequence of constellation passes, wherein the set of head events includes movement instructions for the set of heads.

13. The system according to claim 12, wherein the event manager is further configured to generate a performance prediction report in response to receiving the set of head events.

14. The system according to claim 12, wherein a head constellation visualizer is configured to generate a video of the multihead composite material application machine applying composite material upon the target tool surface model in response to receiving the set of head events.

15. A method of modeling head assignments for a multihead composite material application machine having a set of heads, the method comprising:
    receiving a ply geometry for a composite part;
    receiving a configuration for the multihead composite material application machine;
    generating a constellation of head locations in response to the ply geometry and the configuration for the multihead composite material application machine having a common movable tool carriage, each one of the heads of the set of heads being mounted to the common movable tool carriage;
    assigning ones of the head locations of the constellation of head locations to corresponding ones of the heads of the set of heads, each one of the heads being movable relative to the constellation; and generating a graphical model of the multihead composite material application machine applying composite material upon the composite part in response to the assigned head locations.

16. The method according to claim 15, further comprising: receiving a target tool file corresponding to the composite part.

17. The method according to claim 16, further comprising: generating a path and a target tool surface model in response to receiving the target tool file.

18. The method according to claim 17, further comprising: generating a sequence of constellation passes in response to receiving the constellation of head locations, the path and the target tool surface model, wherein the sequence of constellation passes includes a corresponding constellation of head locations for each pass of the multihead composite material application machine along the target tool surface model.

19. The method according to claim 18, further comprising: generating a set of head events in response to the sequence of constellation passes, wherein the set of head events includes movement instructions for the set of heads.

20. The method according to claim 19, further comprising: generating a performance prediction report in response to receiving the set of head events.

21. The method according to claim 19, further comprising: generating a video of the multihead composite material application machine applying composite material upon the target tool surface model in response to receiving the set of head events.

22. A computer readable medium on which is embedded computer software comprising a set of instructions for executing a method of modeling head assignments for a multihead composite material application machine having a set of heads, the method comprising:

receiving a ply geometry for a composite part;

receiving a configuration for the multihead composite material application machine;

generating a constellation of head locations in response to the ply geometry and the configuration for the multihead composite material application machine having a common movable tool carriage, each one of the heads of the set of heads being mounted to the common movable tool carriage;

assigning ones of the head locations of the constellation of head locations to corresponding ones of the heads of the set of heads, each one of the heads being movable relative to the constellation; and simulating the multihead composite material application machine applying composite material upon a target tool surface model in a synchronized simulation mode.

23. The computer readable medium according to claim 22, wherein the step of simulating the multihead composite material application machine applying composite material comprises:

defining each one of the heads of the set of heads as an independent device having five axes or less.

24. The computer readable medium according to claim 23, wherein the step of simulating the multihead composite material application machine applying composite material further comprises:

synchronizing the independent devices by simulating digital communication signals between the independent devices.

25. The computer readable medium according to claim 22, wherein the multihead composite material application machine has a total of more than eighteen axes.

* * * * *